United States Patent
Fervel et al.

(10) Patent No.: US 9,906,469 B2
(45) Date of Patent: Feb. 27, 2018

(54) AIRCRAFT CONTROL SYSTEM WITH MERGED LINKS

(71) Applicant: AIRBUS OPERATIONS (S.A.S.), Toulouse (FR)

(72) Inventors: Marc Fervel, Toulouse (FR); Antoine Maussion, Toulouse (FR); Arnaud Lecanu, Blagnac (FR); Sylvain Sauvant, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 1113 days.

(21) Appl. No.: 14/103,224

(22) Filed: Dec. 11, 2013

(65) Prior Publication Data
US 2014/0180504 A1 Jun. 26, 2014

(30) Foreign Application Priority Data
Dec. 12, 2012 (FR) .................... 12 61922

(51) Int. Cl.
*H04L 12/931* (2013.01)
*H04L 12/707* (2013.01)
(Continued)

(52) U.S. Cl.
CPC ........ *H04L 49/351* (2013.01); *H04L 12/6418* (2013.01); *H04L 45/24* (2013.01); *H04L 49/552* (2013.01)

(58) Field of Classification Search
CPC . H04L 12/6418; H04L 49/351; H04L 49/552; H04L 45/24
See application file for complete search history.

(56) References Cited

U.S. PATENT DOCUMENTS 7,352,744 B2  4/2008  Saint Etienne et al.
8,503,439 B2  8/2013  Monnier
(Continued)

FOREIGN PATENT DOCUMENTS

FR  2832011  5/2001
FR  2920623  3/2007
(Continued)

OTHER PUBLICATIONS

"AFDX Protocol Tutorial", GE Intelligent Platforms, 2010.
French Search Report for Application No. FR 1261922 dated Jul. 31, 2013.

*Primary Examiner* — Brandon Renner
*Assistant Examiner* — Mandish Randhawa
(74) *Attorney, Agent, or Firm* — Jenkins, Wilson, Taylor & Hunt, P.A.

(57) ABSTRACT

The invention relates to an aircraft control system, situated in the avionics bay, including a computer, a remote equipment, such as an actuator of control surfaces, and an AFDX network. The computer includes a first module and a second module, respectively connected to a corresponding first module and a second module of the equipment, by a first and a second virtual link sharing a common path through the network, the first and second virtual links being segregated by a separate encoding at the applicative level. A replication and/or frame switching device is connected, on the one hand, to the common port and, on the other hand, to the ports of the first and second modules of the equipment.

11 Claims, 6 Drawing Sheets

(51) Int. Cl.
H04L 12/939 (2013.01)
H04L 12/64 (2006.01)

(56) References Cited

U.S. PATENT DOCUMENTS

| | | | |
|---|---|---|---|
| 2009/0307748 A1* | 12/2009 | Blom | G06F 21/31 |
| | | | 726/2 |
| 2011/0162081 A1 | 6/2011 | Lopez et al. | |
| 2011/0191659 A1* | 8/2011 | Fuhrmann | H04L 12/40006 |
| | | | 714/807 |
| 2012/0101663 A1 | 4/2012 | Fervel et al. | |
| 2012/0109424 A1* | 5/2012 | Fervel | B64C 13/50 |
| | | | 701/3 |
| 2012/0250572 A1* | 10/2012 | Hall | H04L 49/351 |
| | | | 370/254 |
| 2014/0177839 A1* | 6/2014 | Wagner | H04L 9/0822 |
| | | | 380/259 |

FOREIGN PATENT DOCUMENTS

| | | |
|---|---|---|
| FR | 2943036 | 11/2009 |
| FR | 2933557 | 1/2010 |
| WO | WO 2009/030706 | 3/2009 |
| WO | WO 2010/000965 | 1/2010 |
| WO | WO 2010/103233 | 9/2010 |

* cited by examiner

AIRCRAFT CONTROL SYSTEM WITH MERGED LINKS

TECHNICAL FIELD

The present invention relates in a general manner to aircraft control systems.

BACKGROUND

The flight control system of an aircraft forms the link between the control members (joystick, rudder bar, etc.) and the aerodynamic control surfaces (ailerons, vertical stabilisers, elevators, etc.). Modern airliners have electrical type flight control systems in which mechanical actions on the control members are converted into analogical signals which are transmitted to actuators manoeuvring the control surfaces.

A flight control system comprises in general a plurality of computers intended to receive information items from the control members and/or airplane sensors (accelerometer, gyrometer, inertial navigation system) and to determine from the information items received the flight controls to apply to the actuators.

Traditional flight control systems use specific computers for each flight control function and avionic buses of ARINC 429 or MIL-STD-1553 type, to transmit the commands to the actuators.

A more recent generation of flight control systems calls on Integrated Modular Architecture (IMA), in other words generic computers that come in practice in the form of electronic cards mounted in a rack of the avionics bay and which differ from each other essentially by the software that is executed therein. Furthermore, these new flight control systems use an AFDX (Avionics Full Duplex Switched Ethernet) communication network to transmit the controls to the actuators.

It will be recalled that the AFDX network, specifically developed for the needs of aeronautics, is based on a switched Ethernet network. A detailed description of the characteristics of this network may be found in the document entitled "AFDX protocol tutorial" available on the site www.condoreng.com as well as in the patent application FR-A-2832011 filed in the name of the applicant.

A description of a flight control system using an IMA architecture will moreover be found in the application FR-A-2943036 filed in the name of the present applicant.

FIG. 1 illustrates in a schematic manner the architecture of a flight control system, 100, known from the prior art. This system generally comprises a plurality of generic computers, 110, receiving information items coming from control members (not represented) as well as, if appropriate, from series of airplane sensors (also not represented). The computers determine from these information items the flight controls to apply to the actuators.

The computers transmit the control messages to the actuators via the AFDX network 120. More precisely, each actuator is equipped with a terminal 130, subscribed to the AFDX network, capable of receiving the control messages and sending back information or acquittal messages to the computers. An actuator may moreover be equipped with sensors making it possible to measure the position of the actuated control surface, in which case the associated terminal can also send back to the computer that controls it the information items of the position measure in question. Hereafter, for reasons of commodity, reference will be made indiscriminately to the actuator or to its associated terminal, 130, it being understood that an actuator subscribed to the network is in fact an actuator equipped with a terminal subscribed to the AFDX network.

The AFDX network comprises a plurality of frame switches 140 installed in the avionics bay (demarcated in the figure by a broken line) and switching the virtual links going to and/or coming from different subscribers to the network, in particular the virtual links connecting the computers 110 and the subscribed actuators 130.

In order to reduce the number and the length of the wired links, the AFDX network may comprise frame switching equipment designated micro-switches. These micro-switches make it possible to treat locally the frames coming from or going to a cluster of terminals subscribed to the network. More precisely, a micro-switch has a first port, generally connected to an AFDX switch or directly to a computer, and a plurality of second ports connected to the different subscribed terminals. On the downlink, in other words for frames received by the first port going to a subscribed terminal, the micro-switch plays the role of repeater (hub), in other words that an incident frame on the first port is replicated on all the second ports. The subscribed terminals that receive it determine whether they are addressees, and ignore it in the negative and take it into consideration in the affirmative. On the other hand, on the uplink, in other words for frames transmitted by the different subscribed terminals, the micro-switch scans in turn the second ports and empties their respective buffers on the first port, according to a "round robin" type mechanism, thereby assuring an equitable sharing of the pass band.

It will be noted that the flight control system illustrated in FIG. 1 comprises a plurality of such AFDX micro-switches, 150, each connected to a switch of the avionics bay. A virtual link connecting a computer and an actuator passes via one or more switches, then, if needs be via a micro-switch.

Each computer 110 comprises two calculation modules, namely a control module, 111, known as COM module, and a surveillance module, 112, known as MON module. The MON and COM modules are of identical structure and only differ by the manner in which they are programmed (different algorithms). A COM module may be reconfigured into a MON module and vice versa. The MON and COM modules come in practice in the form of IMA cards mounted in a rack or IMA box of the avionics bay.

The COM module transmits to the actuators control messages via the AFDX network and receives information or confirmation messages from the latter.

The MON module also receives the information or confirmation messages from the actuators and verifies the coherence between the control messages sent by the COM module and the information or confirmation messages that are returned to the latter by the different actuators. The MON module may thus detect a failure of the actuator controlled by the MON module.

In a symmetrical manner, each terminal 130 associated with an actuator is generally equipped with a control module, COM, represented by 131 and a surveillance module, MON, represented by 132. The COM module is charged with applying the electrical orders as a function of the control messages transmitted by the computer. The MON module is for its part charged with verifying whether the electrical orders transmitted by the COM module to the actuator are indeed coherent with the commands transmitted by the computer and, in the event of an anomaly, to notify thereupon the computer.

The COM module of a computer is connected to the COM modules of the actuators that it controls. COM A link commonly designates the link between a COM module of a computer and a COM module of an actuator. In a dual manner, the MON modules of these actuators are connected to the MON module of the computer in question. In a similar manner, MON link designates a link between a MON module of a computer and a MON module of an actuator.

In current flight control systems, the COM and MON links are spatially segregated. In other words, the COM links and the MON links do not share any common element of the AFDX network. They do not use in particular the same switches or micro-switches and do not use the same wired links. The aim of this spatial segregation is to avoid a simultaneous corruption of the information items on the two links and thus to maintain a high level of reliability.

Finally, the AFDX network is made redundant to satisfy the requirements of availability. In other words, the subscribers of the network are connected to two identical AFDX networks (also known as network layers), designated by A and B. Thus, each COM module of a computer comprises a first port, $P_C^{COMA}$, connected to the layer A and a second port $P_C^{COMB}$ connected to the layer B. The COM module of the recipient terminal also comprises a port $P_E^{COMA}$ connected to the layer A and a port $P_E^{COMB}$ connected to the layer B. When the COM module of a computer transmits a control message to the recipient terminal, two identical messages are in fact transmitted in parallel by the ports $P_C^{COMA}$ and $P_C^{COMB}$, respectively on the layers A and B. A COM A link and a COM B link are then distinguished according to the network through which the COM link transits.

In the same way, each MON module of a computer or of a recipient terminal comprises a first port, $P_C^{MONA}$ connected to the network A and a second port, $P_C^{MONB}$, connected to the network B. A MON A link and a MON B link are then distinguished, according to the network through which the MON link transits. In all cases, the messages transmitted on the two networks A and B are strictly identical.

The spatial segregation constraints on the one hand and the redundancy of the AFDX network on the other hand imply that, for each computer 110 controlling an actuator 130, four cables are necessary, corresponding respectively to the COM A, COM B, MON A, MON B links. Given that most control surfaces are situated far from the avionics bay, the amount of cabling necessary to connect the actuators to the nodes of the network is thus particularly important.

The aim of the present invention is consequently to propose an aircraft control system overcoming the aforementioned drawbacks, in particular to reduce the cabling between the avionics bay and the actuators without sacrificing the aforementioned reliability and/or availability requirements.

SUMMARY

The present invention is defined by an aircraft control system comprising a computer and a remote equipment, the computer comprising a first and a second module, the first module of the computer being connected to a first module of said equipment through an AFDX network by means of a first virtual link, and the second module of the computer being connected to a second module of said equipment through this same network, in which:

said equipment comprises a repetition and/or frame switching device connected, on the one hand, to a common port of the equipment connected to the AFDX network, and, on the other hand, to a port of the first module of the equipment and a port of the second module of the equipment;

said first and second virtual links share a common path through the AFDX network, each frame transmitted on the first or the second virtual link being obtained by encoding at a protocol level higher than that of the layer link, the encoding being separate for said first and second virtual links.

According to a first variant, the repetition and/or frame switching device is a hybrid repetition and frame switching device, any frame transmitted by the computer to the remote equipment, arriving on the common port, being replicated by said device to be sent on the port of the first module or the port of the second module, any frame transmitted by the remote equipment to the computer, coming from the first module or the second module of the equipment being switched by said device to the common port.

According to a second variant, the repetition and/or frame switching device is a frame switch, each frame arriving on a port of the switch being switched onto another port as a function of the virtual link to which it belongs.

According to a third variant, the repetition and/or frame switching device is a frame repeater, each frame arriving on a port of the repeater being repeated on all its other ports.

According to a first embodiment the aircraft control system comprises:

a first transmitting application hosted by the first module of the computer encodes beforehand the packets that it transmits by means of a first CRC code at the applicative level, the packets thereby encoded being transmitted in the form of frames on the first virtual link, a first receiving application hosted by the first module of the equipment verifying the integrity of each packet thereby received by means of said first CRC code;

a second transmitting application hosted by the second module of the computer encodes beforehand the packets that it transmits by means of a second CRC code at the applicative level, separate from the first, the packets thereby encoded being transmitted in the form of frames on the second virtual link, a second receiving application hosted by the second module of the equipment verifying the integrity of each packet received by means of said second CRC code.

According to a second embodiment, the aircraft control system comprises:

a first transmitting application hosted by the first module of the computer numerically signs beforehand the packets that it transmits by means of a public key system using a first hash function and a first public key, the packets thereby signed being transmitted in the form of frames on the first virtual link, a first receiving application hosted by the first module of the equipment verifying the integrity of each packet thereby received by means of a first private key corresponding to the first public key;

a second transmitting application hosted by the second module of the computer numerically signs beforehand the packets that it transmits by means of a public key system using a second hash function and a second public key, separate from the first, the packets thereby signed being transmitted in the form of frames on the second virtual link, a second receiving application hosted by the second module of the equipment verifying the integrity of each packet thereby received by means of a second private key corresponding to the second public key.

According to a third embodiment of the aircraft control system, the AFDX network has a first layer, A, and a second layer, B, of identical structure;

the first and second modules of the computer each have a first port connected to the layer A and a second port connected to the layer B;

the first and second modules of the equipment each have a first port connected to the layer A and a second port connected to the layer B;

the equipment has a first common port connected to the layer A and a second common port connected to the layer B, the equipment further comprising a first replication and/or frame switching device, connected, on the one hand, to the first common port of the equipment and, on the other hand, to the first ports of the first and second modules of the equipment, as well as a second replication and/or frame switching device, connected, on the one hand, to the second common port of the equipment and, on the other hand, to the second ports of the first and second modules of the equipment.

In a fourth embodiment of the aircraft control system, the AFDX network has a first layer, A, and a second layer, B, of identical structure, and:

the first and second modules of the computer each have a first port connected to the layer A and a second port connected to the layer B;

the equipment has a first common port connected to the layer A and a second common port connected to the layer B, the equipment further comprising a first replication and/or frame switching device, connected, on the one hand, to the first common port of the equipment and, on the other hand, to the ports of the first and second modules of the equipment, as well as a second replication and/or frame switching device, connected, on the one hand, to the second common port of the equipment and, on the other hand, to the ports of the first and second modules of the equipment;

the incident frames on the port of a module of the equipment being selectively received by a first and a second logic port according to whether they have been transmitted by the layer A or the layer B.

The remote equipment may be for example an actuator of control surfaces, said actuator being subscribed to the AFDX network.

The first modules of the computer and the equipment are typically control modules, and the second modules of the computer and the equipment are surveillance modules.

Advantageously, the first and second modules of the computer are control modules of identical structure and the first and second modules of the equipment are also control modules of identical structure.

The invention also relates to an aircraft comprising an aircraft control system as described above.

BRIEF DESCRIPTION OF DRAWINGS

Other features and advantages of the invention will become clear on reading the preferential embodiments of the invention made with reference to the appended figures, among which.

DETAILED DESCRIPTION

An aircraft control system comprising a plurality of generic computers situated in the avionics bay, a plurality of remote elements and an AFDX network making it possible to connect the first to the second by means of virtual links will again be considered. Remote equipment is here taken to mean an equipment situated outside of the avionics bay. This equipment is subscribed to the AFDX network, in other words may receive and transmit frames on this network going to and coming from a generic computer, and, in a more general manner, from another subscribed to this network.

The generic computers may be grouped together in the form of elementary control systems taking respectively in charge particular functions of the aircraft, such as the flight control system, the propulsion control system, the landing gear braking control system, the wheel orientation control system, the hydraulic circuits control system, etc., each elementary control system controlling one or more remote items of equipment via the AFDX network.

In an aim of simplifying the presentation and without prejudice of generalisation, the case of a generic computer connected to a remote equipment will be considered hereafter. This remote equipment may be for example a control surface actuator, a braking system actuator, a propulsion system actuator, etc. It is nevertheless clear for those skilled in the art that the control system may comprise several generic computers, each controlling one or more remote items of equipment.

The basic idea of the invention is to guarantee the integrity of the COM and MON links connecting a computer to an equipment without resorting to a spatial segregation thereof between the AFDX switch to which is connected the computer and the equipment. More precisely, the guarantee of the integrity of these links is obtained by a separate encoding of these links, intervening at a protocol level higher than that of the layer link, preferably at an applicative layer. Within the equipment, a repetition/switching device is provided to replicate the frames on the downlink and to switch them on the uplink, as described in detail hereafter.

Figure 1:
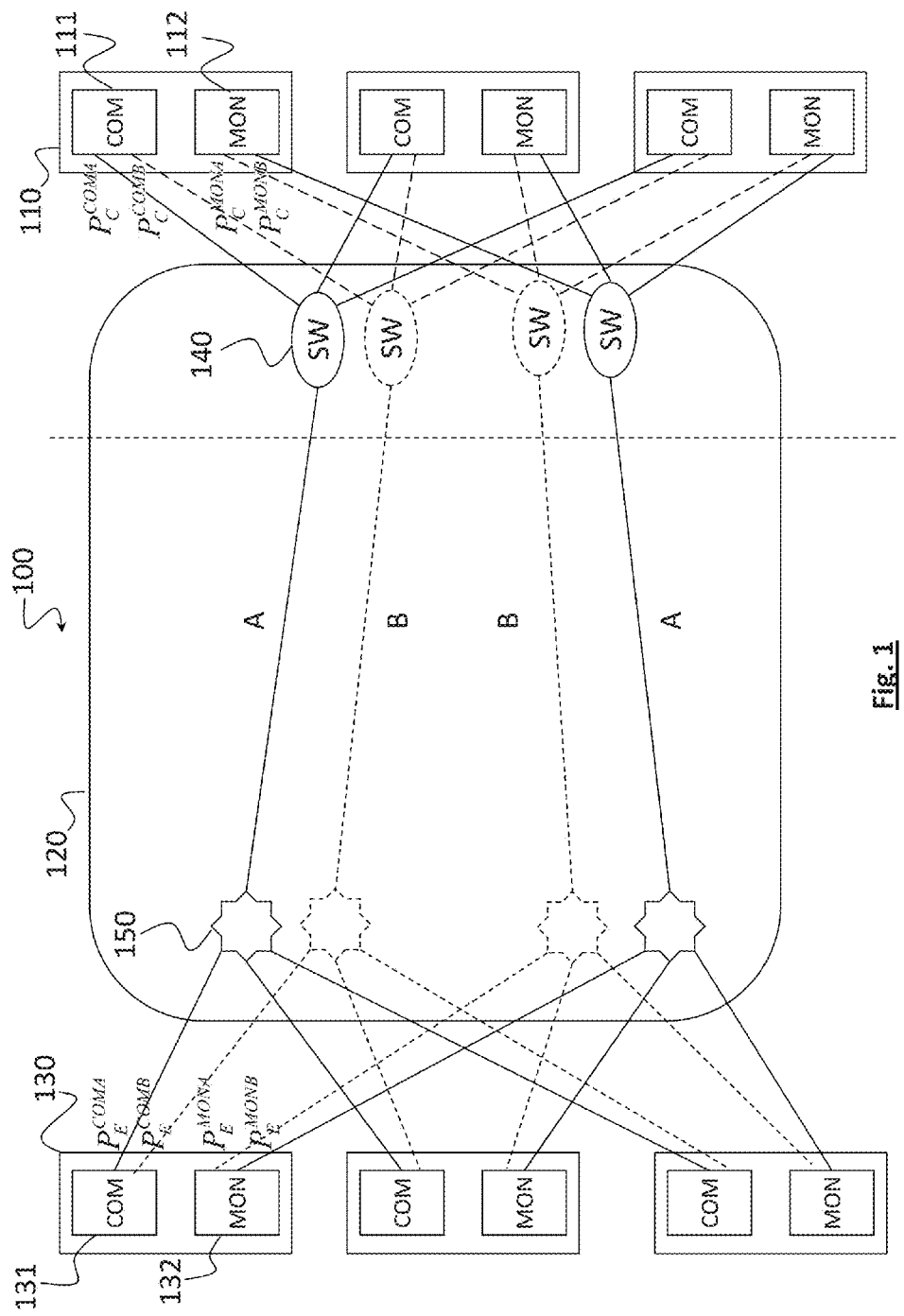
FIG. 1 illustrates schematically the architecture of a flight control system known from the prior art.
Figure 2:
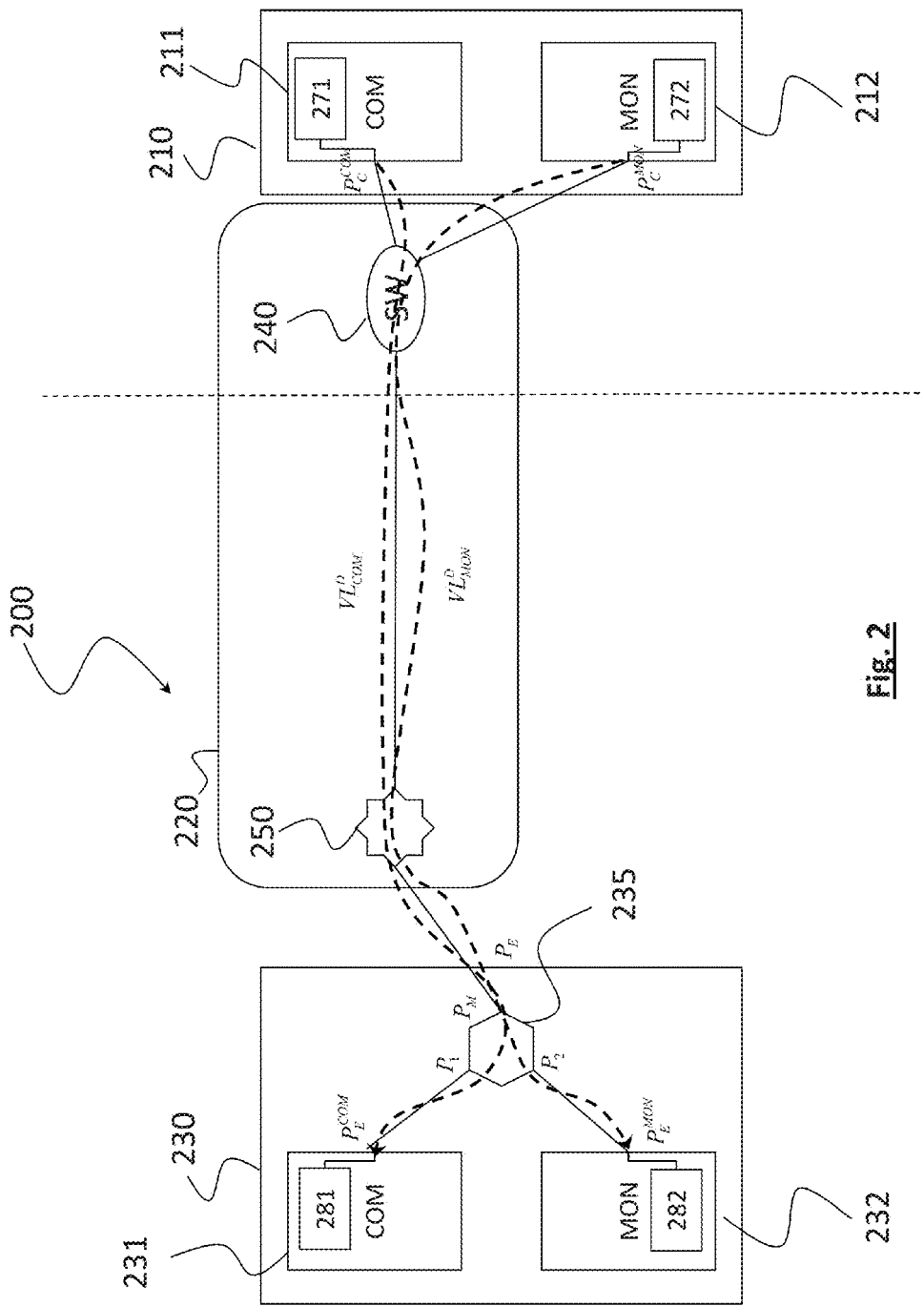
FIG. 2 illustrates schematically the architecture of a control system of an aircraft according to a first embodiment of the invention.

FIG. 2 represents schematically a control system according to an embodiment of the invention.

The control system, 200, comprises a generic computer 210, comprising a control module, COM, 211, and a surveillance module, MON, 212. The COM and MON modules are typically identical IMA electronic cards but equipped with different software. Similarly, the equipment 230 comprises a COM control module, 231 and a MON surveillance module, 232.

The computer 210 generally receives information items from control members (not represented) from which it determines the control messages to transmit to the equipment 230.

More precisely, on the downlink, the COM module of the computer, 211, transmits control messages to the COM module of the remote equipment, 231, by means of a first virtual link $VL_{COM}^D$. Similarly, the MON module of the computer, 212, can transmit messages on the downlink, by means of a second virtual link $VL_{MON}^D$.

In the same way, on the uplink, the COM module (resp. MON) of the remote equipment, 231 (resp. 232), transmits acquittal or information messages to the COM module (resp. MON), 211 (resp. 212) of the computer by means of a third virtual link $VL_{COM}^U$ not represented (resp. of a fourth virtual link $VL_{MON}^U$ also not represented).

It is important to note that the virtual links $VL_{COM}^D$ and $VL_{MON}^D$ take the same path through the network between the AFDX switch, 240, and the common port $P_E$, of the equipment. Similarly, the virtual links $VL_{COM}^U$ and $VL_{MON}^U$ take the same path through the network between the common port $P_E$ of the equipment and the AFDX switch. In other words, in the present case, a single physical link is necessary between the AFDX switch and the equipment 230.

It is assumed in FIG. 2 that the path taken by the virtual links $VL_{COM}^D$ and $VL_{MON}^D$, on the one hand, and the virtual links $VL_{COM}^U$ and $VL_{MON}^U$, on the other hand, passes via an AFDX switch 240 and a micro-AFDX switch 250. Nevertheless, in certain cases (for example if the equipment does not form part of a cluster), only the AFDX switch 240 may be present, in which case the port $P_E$ is directly connected to a port of the switch. In other cases, on the contrary, only the micro-AFDX switch 250 may be present, in which case the respective ports $P_C^{COM}$ and $P_C^{MON}$ of the COM and MON modules of the computer 210, as well as the port $P_E$ of the equipment, are connected to one of the second ports of the micro-switch. In a particular case, in order to increase the number of computers or items of equipment connected, a second micro-switch may be connected to the first. The two micro-switches are then connected directly via their first port in a configuration known as head to tail as described in the application WO-A-2009/030706 in the name of the present applicant.

Whatever the configuration used, the equipment 230 comprises a repetition/switching device 235.

This device, internal to the equipment, has a first port, noted $P_M$, connected to the port $P_E$ and two seconds ports, noted $P_1$ and $P_2$, respectively connected to the ports $P_E^{COM}$ and $P_E^{MON}$ of the COM, 231, and MON, 232 modules. This device switches or instead replicates the incident frames on one of ports to its two other ports, as detailed in the variants below.

According to a first variant, the repetition/switching device 235 plays the role of a micro-switch. In this case, the incident frames on the first port $P_M$ are replicated on each of the second ports $P_1$ and $P_2$ (repeater function on the downlink) and the incident frames on the ports $P_1$ and $P_2$ are transmitted in turn on the first port $P_M$ (switching function on the uplink). Thus, when a frame is transmitted by the COM module, 211, of the computer to the COM module, 231, of the equipment, it is indeed replicated by the device 235, and sent both on the port $P_E^{COM}$ and the port $P_E^{MON}$. However, the MON module will reject this frame, since, after inspection of its header, it will determine that it is not addressed to it.

According to a second variant, the repetition/switching device 235 plays the role of a simple repeater. Its functioning will thus be identical to that of the first variant as regards the downlink. On the other hand, on the uplink, if for example the COM module, 231, of the equipment transmits a frame to the COM module, 211, of the computer, this frame will be replicated by the device 235 both on the port $P_M$ and the port $P_2$. Nevertheless, the MON module that will receive this frame will reject it since it is not addressed to it.

According to a third variant, the repetition/switching device 235 plays the role of an AFDX switch. In such a case, the virtual links $VL_{COM}^D$ and $VL_{MON}^D$ are routed up to the ports $P_E^{COM}$ and $P_E^{MON}$ respectively, in other words the frames intended for the COM, 231, and MON, 232, modules are switched by the device 235 respectively on its ports $P_1$ and $P_2$. Similarly, the virtual links $VL_{COM}^U$ and $VL_{MON}^U$ are from the $P_E^{COM}$ and $P_E^{MON}$, and routed to the port $P_M$. In other words, the frames from the COM, 231, and MON, 232, modules arriving respectively on the ports $P_1$ and $P_2$ are switched by the device in question to the port $P_M$. It should be noted that the third variant, unlike the preceding variants, makes it possible to route virtual links between the COM and MON modules in the case where a communication between these two modules could prove to be necessary.

Whatever the envisaged variant, the integrity of the COM and MON links through the network (apart from the segregation of the virtual links $VL_{COM}^D$ and $VL_{MON}^D$ on the downlink and the virtual links $VL_{COM}^U$ and $VL_{MON}^U$ on the uplink) is assured by means of an encoding at a protocol level higher than that of the layer link in the OSI model, preferably by means of an encoding at the applicative level.

This encoding applies to the packets or PDUs (Packet Data Units) of the layer in question and may comprise for example a CRC calculation or a digital signature of each packet. The CRC code or the digital signature is added to the packet.

More precisely, a transmitting application on the COM link (executed for example in the COM module of the computer) or on the MON link (executed for example in the MON module of the computer) uses a CRC encoding and/or a digital signature for the transmission of its packets. Digital signature of a packet is taken to mean the application of a hash function to generate a condensate and the encryption of the condensate by means of a public key encryption mechanism, in a manner known per se. The condensate thereby encrypted, in other words the signature, is added to the packet. According to the case, the receiving application uses the CRC code or the private encryption key to determine whether the packet received from the transmitting application is integrated, in other words to verify that the data of the packet has not been altered during the transmission on the network. A packet in which the data are altered is rejected. The mechanism of guaranteeing integrity by encoding has been described in the application FR-A-2 933 557 filed in the name of the present applicant.

271 and 272 are used to note transmitting applications executed respectively by the COM and MON modules of the computer. The receiving applications executed respectively by the COM and MON modules of the equipment have been noted 281 and 282.

According to a first variant, the applications 271 and 272 use separate CRC codes. The parity bits are added to the packet transmitted by the application 271, resp. 272. It should be noted that this protection mechanism is different to the underlying protection mechanism which may be present at the level of the layer link (protection of the AFDX frames by CRC).

According to a second variant, the applications 271 and 272 use hash functions $h_1$ and $h_2$ (separate or not) as well as separate public keys $PUK_1$ and $PUK_2$. Each packet of the application 271 (resp. 272) is hashed by means of the hash function $h_1$ (resp. $h_2$) and signed by means of the public key $PUK_1$ (resp. $PUK_2$) before being transmitted in the form of frames on the virtual link $VL_{COM}^D$ (resp. $VLD_{MON}^D$).

The use of separate encoding (separate CRC codes in the first variant and couples of separate private/public keys in the second variant) for the two COM and MON links makes it possible to assure their segregation.

Figure 3:
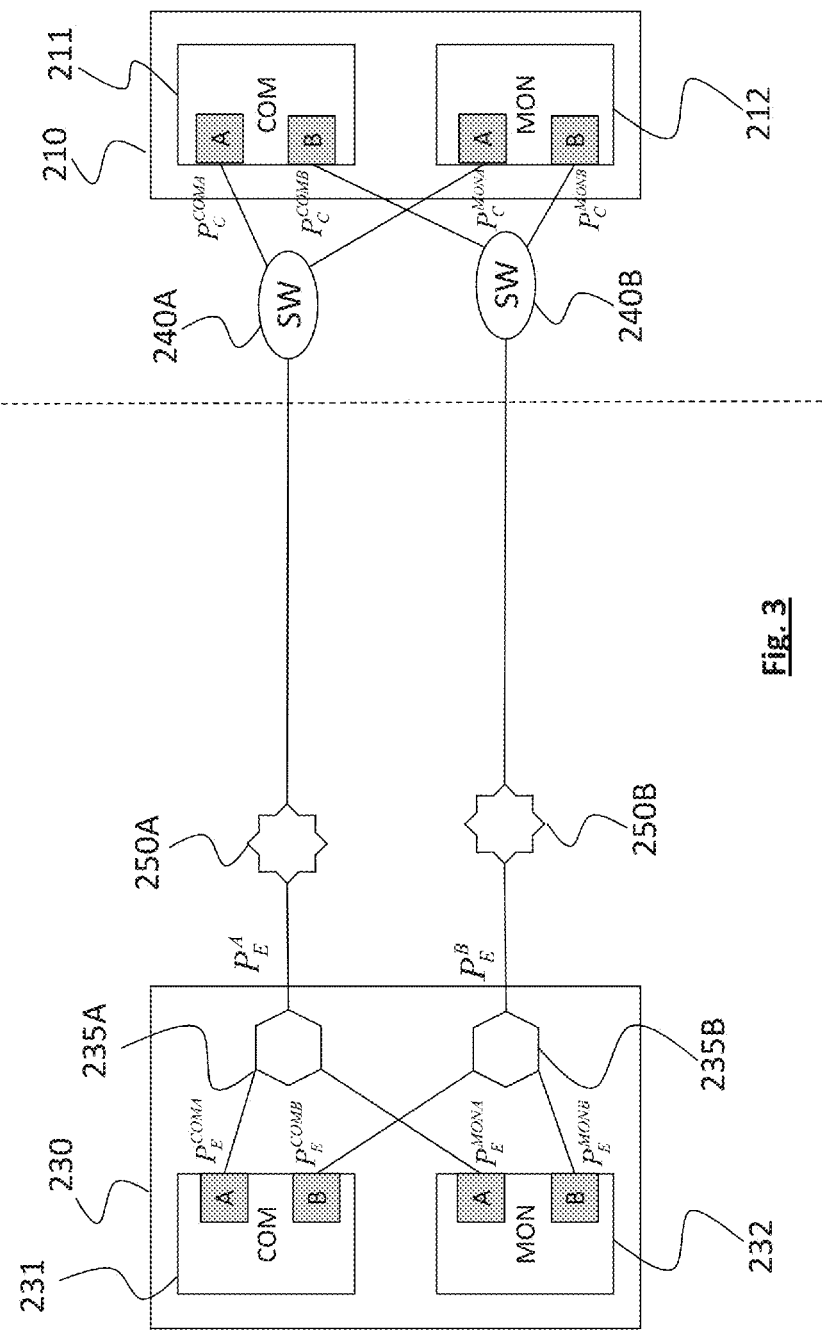
FIG. 3 illustrates schematically the architecture of a control system of an aircraft according to a second embodiment of the invention.

In order to further improve the operating reliability of the control system, it is possible to combine the encoding and the spatial segregation of the COM and MON links as represented in FIG. 3.

FIG. 3 illustrates a control system according to a second embodiment of the invention.

This second embodiment differs from the first in the sense that it uses a redundant AFDX network, in other words two AFDX networks of identical structure (also said to be two layers of AFDX network), respectively noted A and B, connecting the generic computer and the remote equipment. In this case, each COM module of the computer (resp. of the remote equipment) has two separate ports, namely a port $P_C^{COMA}$ (resp. $P_E^{COMA}$) connected to the network A and a port $P_C^{COMB}$ (resp. $P_E^{COMB}$), connected to the network B. In the same way, each MON module of the computer (resp. of the remote equipment) has two separate ports, a port $P_C^{MONA}$ (resp. $P_E^{MONA}$) connected to the network A and a port $P_C^{MONB}$ (resp. $P_E^{MONB}$) connected to the network B. Thus, the COM A link connecting the ports $P_C^{COMA}$ and $P_E^{COMA}$ passes via the network A whereas the COM B link connecting the ports $P_C^{COMB}$ and $P_E^{COMB}$ passes via the network B. In the same way, the MON A link connecting the ports $P_C^{MONA}$ and $P_E^{MONA}$ passes via the network A whereas the MON B link connecting the ports $P_C^{MONB}$ and $P_E^{MONB}$ passes via the network B.

It will further be noted that the COM A and MON A links use a common path through the network A, of the AFDX switch 240A up to the port $P_E^A$. Within the remote equipment 230, the repetition/switching device 235A makes it possible to separate the COM A and MON A links. In a similar manner, the two COM B and MON B links use a common path through the network B, from the AFDX switch 240B up to the port $P_E^B$. Within the remote equipment 230, the repetition/switching device 235B makes it possible to separate the COM B and MON B links.

In this embodiment, the applications are configured to select as a priority segregated paths. For example, the COM module of the equipment will choose as a priority the frames having transited via the direct path (in other words via the switch 240A, the micro-switch 250A and the repetition/switching device 235A). In the event of failure or errors on these frames, the equipment will choose the frames having transited via the indirect path (in other words via the switch 240B, the micro-switch 250B and the repetition/switching device 235B).

Thus, it is understood that if one of the two networks A and B is faulty, a couple of MON and COM links will remain operational.

The applications 271,272 and 281,282 (not represented here) use the same encoding system as in the first embodiment, for the purposes of verification of the integrity.

In the second embodiment, the COM and MON modules of the remote equipment are each provided with two separate ports. The ports $P_E^{COMA}$, $P_E^{COMB}$ of the COM module are respectively connected to the repetition/switching devices 235A and 235B. The ports $P_E^{MONA}$, $P_E^{MONB}$ of the MON module are respectively connected to the repetition/switching devices 235A and 235B, as represented in FIG. 4A.

Alternatively, each of the COM and MON modules may be equipped with only a single port, the separation of the A and B links then being carried out at the applicative level.

Figure 4B:
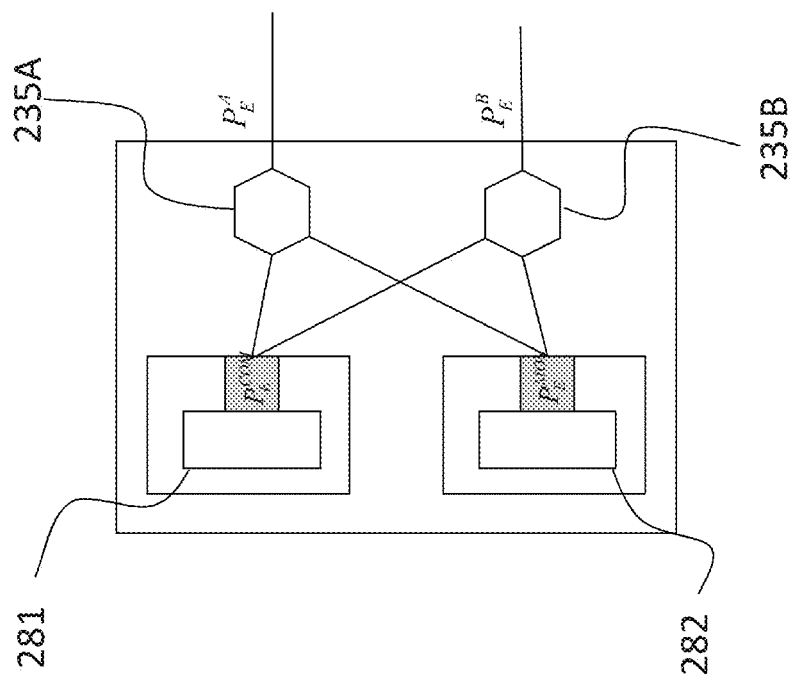
FIGS. 4A and 4B illustrate two variants of interface of the remote equipment of FIG. 3.
Figure 4A:
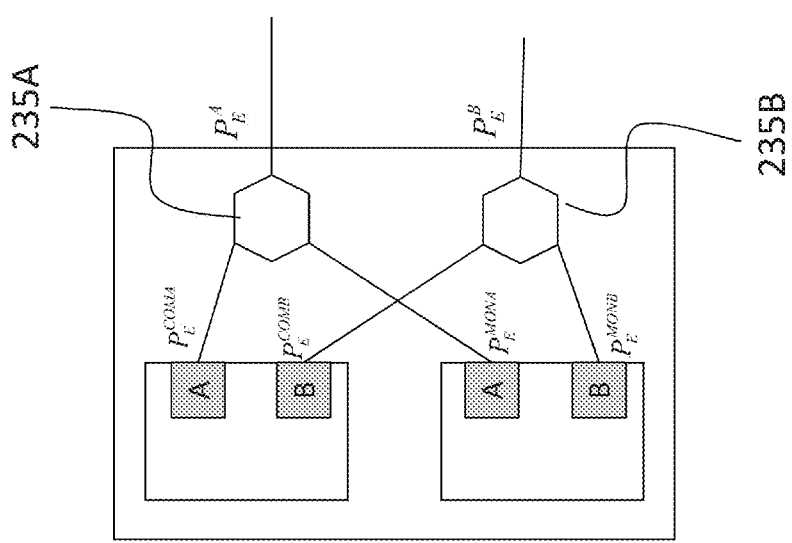

This variant is illustrated schematically in FIG. 4B for the COM and MON modules of the remote equipment. The port $P_E^{COM}$ of the COM module is connected to the repetition/switching devices 235A and 235B. The port $P_E^{MON}$ of the MON module is also connected to these two modules. The application 281 performs the separation between the packets from the COM A link and the packets from the COM B link. In other words, the application 281 (or even a lower protocol layer) has a first logic port receiving the packets of the COM A link and a second logic port receiving the packets of the COM B link. In a similar manner, the application 282 (or even a lower protocol layer) has a first logic port receiving the packets of the MON A link and a second logic port receiving the packets of the MON B link. The discrimination between the packets of the COM A and COM B links, or between the packets of the MON A and MON B links, may take place by means of a single bit in the packet header.

Figure 5:
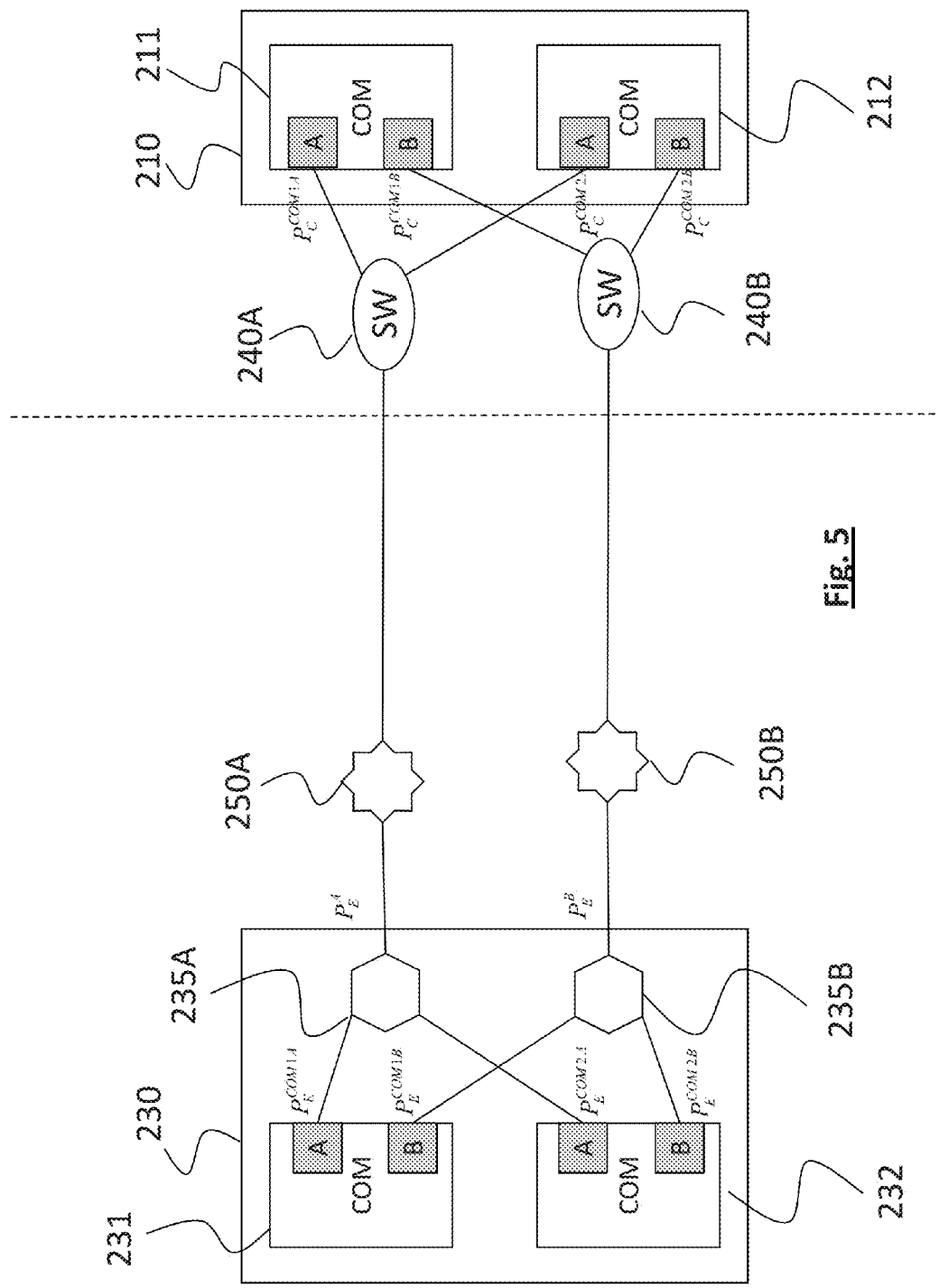
FIG. 5 illustrates schematically the architecture of a control system of an aircraft according to a third embodiment of the invention.

FIG. 5 illustrates a control system of an aircraft according to a third embodiment of the invention.

This third embodiment differs from the second in the sense that the remote equipment and the computer each have two COM modules instead of a COM module and a MON module. This equipment with two COM modules makes it possible to double the analogical input-output chains in order to ensure a high availability of the latter.

More precisely, the first COM module, 211, of the computer has a first port $P_C^{COM1A}$ connected to the switch 240A of the layer A and a second port $P_C^{COM1B}$ connected to the switch 240B of the layer B of the network. Similarly, the second COM module, 212, of the computer has a first port $P_C^{COM2A}$ connected to the switch 240A of the network A and second port $P_C^{COM2B}$ connected to the switch 240B of the network B. The remote equipment has a first COM module, 231, connected to the first COM module of the computer via the layers A and B, and a second COM module, 232, connected to the second COM module of the computer by means of the layers A and B.

The replication/frame switching device 235A is connected, on the one hand, to the common port $P_E^A$ of the equipment and, on the other hand, to the ports $P_E^{COM1A}$ and $P_E^{COM2A}$ of the respective modules 231 and 232. Similarly, the replication/frame switching device 235B is connected, on the one hand, to the common port $P_E^B$ of the equipment and, on the other hand, to the ports $P_E^{COM1B}$ and $P_E^{COM2B}$ of the respective modules 231 and 232. The different variants of replication/switching devices described above are also applicable here.

This third embodiment is adapted to control systems not requiring a high integrity but for which availability is critical. It is understood in fact that the loss of only one of the networks A and B, optionally combined with an analogical input or output failure on one of the COM modules of the equipment, will not lead to a functional loss.

Figure 6:
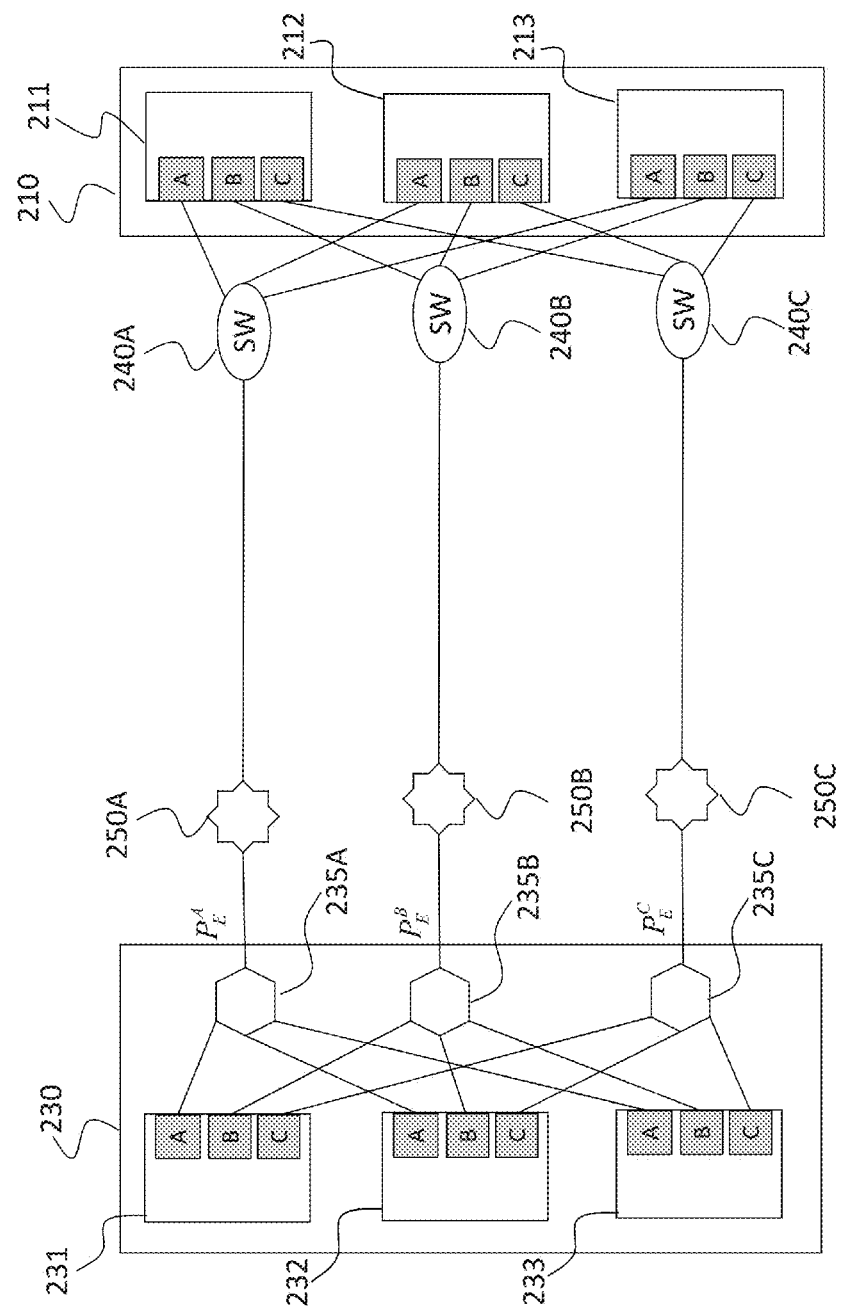
FIG. 6 illustrates schematically the architecture of a control system of an aircraft according to a fourth embodiment of the invention.

FIG. 6 illustrates a control system of an aircraft according to a fourth embodiment of the invention.

This embodiment is similar to the preceding embodiment but differs therefrom in that it uses a triplex redundancy. It will be recalled that, in a control system with triplex redundancy, the control messages are transmitted to the receiving equipment by three separate links and that, when a message is different from the two others, due for example to a corruption during the transmission on the network, the receiving equipment takes a decision by a majority vote.

The AFDX network here comprises three separate layers, of identical structure, designated A, B and C, the computer 210 and the remote equipment 230 being subscribed to each of the layers of the network.

More precisely, the computer comprises three separate modules 211, 212, 213, performing separate calculations and each transmitting control messages from information items received from the control members. The modules 211, 212, 213 are respectively connected to the layers A, B and C of the network.

The remote equipment has three common ports $P_E^A$, $P_E^B$, $P_E^C$, respectively connected to the layers A, B and C. It also comprises three separate modules 231, 232, 233, each module of the equipment corresponding to a module of the computer 211, 212, 213 respectively, a module of the equipment receiving the frames of the corresponding module of the computer via the three layers A, B and C of the network, in parallel. To this end, three replication and/or frame switching devices 235A, 235B, 235C are provided. The device 235A is connected on the one hand to the port $P_E^A$ of the equipment and to the ports 231A, 232A and 233A of the modules 231, 231 and 233 respectively. The device 235B is connected on the one hand to the port $P_E^B$ of the equipment and to the ports 231B, 232B and 233B of these modules. Finally, the device 235C is connected on the one hand to the port $P_E^C$ of the equipment and to the ports 231C, 232C and 233C of these same modules.

The operation of the devices 235A, 235B, 235C is similar to the operation of the devices 235A and 235B of the preceding embodiment and their different variants (repeater/switch hybrid, repeater, switch) are also applicable here.

Those skilled in the art will further understand that this fourth embodiment extends without difficulty to any number of modules of computer/modules of equipment and network layers by adapting the vote algorithm to the chosen topology.

The invention claimed is:

1. An aircraft control system comprising a computer and a remote equipment, the computer comprising a first and a second module, the first module of the computer being connected to a first module of said equipment through an Avionics Full Duplex Switched Ethernet (AFDX) network by a first virtual link, and the second module of the computer being connected to a second module of said equipment by a second virtual link through this same network, characterised in that:
said equipment comprises a repetition and/or frame switching device connected to a common port of the equipment connected to the AFDX network, and to a port of the first module of the equipment and a port of the second module of the equipment, wherein the remote equipment is located outside the avionics bay;
said first and second virtual links share a common path through the AFDX network, each frame transmitted on the first or the second virtual link being obtained by encoding at a protocol level higher than that of the layer link, the encoding being separate for said first and second virtual links,
wherein the AFDX network has a first layer, A, and a second layer, B, of identical structure, and wherein:
the first and second modules of the computer each have a first port connected to the layer A and a second port connected to the layer B:
the first and second modules of the equipment each have a first port connected to the layer A and a second port connected to the layer B:
the equipment has a first common port connected to the layer A and a second common port connected to the layer B, the equipment further comprising a first replication and/or frame switching device connected to the first common port of the equipment and to the first ports of the first and second modules of the equipment, as well as a second replication and/or frame switching device, connected to the second common port of the equipment and to the second ports of the first and second modules of the equipment.

2. An aircraft control system according to claim 1, wherein the repetition and/or frame switching device is a hybrid repetition and frame switching device, any frame transmitted by the computer to the remote equipment, arriving on the common port, being replicated by said device to be sent on the port of the first module or the port of the second module, any frame transmitted by the remote equipment to the computer, coming from the first module or the second module of the equipment being switched by said device to the common port.

3. An aircraft control system according to claim 1, wherein the repetition and/or frame switching device is a frame switch, each frame arriving on a port of the switch being switched onto another port as a function of the virtual link to which it belongs.

4. An aircraft control system according to claim 1, wherein the repetition and/or frame switching device is a frame repeater, each frame arriving on a port of the repeater being repeated on all its other ports.

5. An aircraft control system according to claim 1, wherein:
a first transmitting application hosted by the first module of the computer encodes beforehand the packets that it transmits by a first CRC code at the applicative level, the packets thereby encoded being transmitted in the form of frames on the first virtual link, a first receiving application hosted by the first module of the equipment verifying the integrity of each packet thereby received by said first CRC code;
a second transmitting application hosted by the second module of the computer encodes beforehand the packets that it transmits by a second CRC code at the applicative level, separate from the first, the packets thereby encoded being transmitted in the form of frames on the second virtual link, a second receiving application hosted by the second module of the equipment verifying the integrity of each packet received by said second CRC code.

6. An aircraft control system according to claim 1, wherein:
a first transmitting application hosted by the first module of the computer numerically signs beforehand the packets that it transmits by a public key system using a first hash function and a first public key, the packets thereby signed being transmitted in the form of frames on the first virtual link, a first receiving application hosted by the first module of the equipment verifying the integrity of each packet thereby received by a first private key corresponding to the first public key;
a second transmitting application hosted by the second module of the computer numerically signs beforehand the packets that it transmits by a public key system using a second hash function and a second public key, separate from the first, the packets thereby signed being transmitted in the form of frames on the second virtual link, a second receiving application hosted by the second module of the equipment verifying the integrity of each packet thereby received by a second private key corresponding to the second public key.

7. An aircraft control system according to claim 1, wherein the remote equipment is an actuator of control surfaces, said actuator being subscribed to the AFDX network.

8. An aircraft control system according to claim 1, wherein the first modules of the computer and of the equipment are control modules, and that the second modules of the computer and of the equipment are surveillance modules.

9. An aircraft control system according to claim 1, wherein the first and second modules of the computer are control modules of identical structure and that the first and second modules of the equipment are also control modules of identical structure.

10. An aircraft comprising an aircraft control system according to claim 1.

11. An aircraft control system comprising a computer and a remote equipment, the computer comprising a first and a second module, the first module of the computer being connected to a first module of said equipment through an Avionics Full Duplex Switched Ethernet (AFDX) network by a first virtual link, and the second module of the computer being connected to a second module of said equipment by a second virtual link through this same network, wherein:

said equipment comprises a repetition and/or frame switching device connected to a common port of the equipment connected to the AFDX network, and to a port of the first module of the equipment and a port of the second module of the equipment, wherein the remote equipment is located outside the avionics bay;

said first and second virtual links share a common path through the AFDX network, each frame transmitted on the first or the second virtual link being obtained by encoding at a protocol level higher than that of the layer link, the encoding being separate for said first and second virtual links, wherein the AFDX network has a first layer, A, and a second layer, B, of identical structure, and that:

the first and second modules of the computer each have a first port connected to the layer A and a second port connected to the layer B;

the equipment has a first common port connected to the layer A and a second common port connected to the layer B, the equipment further comprising a first replication and/or frame switching device, connected to the first common port of the equipment and to the ports of the first and second modules of the equipment, as well as a second replication and/or frame switching device, connected to the second common port of the equipment and to the ports of the first and second modules of the equipment;

the incident frames on the port of a module of the equipment being selectively received by a first and a second logic port according to whether they have been transmitted by the layer A or the layer B.

* * * * *